United States Patent
Onda et al.

(10) Patent No.: US 10,101,243 B2
(45) Date of Patent: Oct. 16, 2018

(54) TRAVEL WHEEL DEGRADATION DETECTION METHOD AND DETECTION SYSTEM, AND TRAVEL CARRIAGE

(71) Applicant: Murata Machinery, Ltd., Kyoto-shi, Kyoto (JP)

(72) Inventors: Yoshinori Onda, Inuyama (JP); Tetsuya Sato, Inuyama (JP)

(73) Assignee: Murata Machinery, Ltd. (JP)

( * ) Notice: Subject to any disclaimer, the term of this patent is extended or adjusted under 35 U.S.C. 154(b) by 202 days.

(21) Appl. No.: 15/110,087

(22) PCT Filed: Jan. 20, 2015

(86) PCT No.: PCT/JP2015/051315
§ 371 (c)(1),
(2) Date: Jul. 6, 2016

(87) PCT Pub. No.: WO2015/136985
PCT Pub. Date: Sep. 17, 2015

(65) Prior Publication Data
US 2016/0327454 A1   Nov. 10, 2016

(30) Foreign Application Priority Data
Mar. 10, 2014   (JP) ................. 2014-046797

(51) Int. Cl.
*G01M 17/013* (2006.01)
*B61B 3/02* (2006.01)
(Continued)

(52) U.S. Cl.
CPC ....... *G01M 17/013* (2013.01); *B60B 17/0003* (2013.01); *B61B 3/02* (2013.01); *B61B 13/00* (2013.01)

(58) Field of Classification Search
None
See application file for complete search history.

(56) References Cited

U.S. PATENT DOCUMENTS 2,709,471 A * 5/1955 Smith ............. B60C 7/10
152/302
5,561,415 A * 10/1996 Dieckmann ........ B60C 23/061
340/438
(Continued)

FOREIGN PATENT DOCUMENTS

JP   2002-308404 A   10/2002
JP   3509330 B2   1/2004
(Continued)

OTHER PUBLICATIONS

International Preliminary Report on Patentability dated Sep. 13, 2016 in PCT Application No. PCT/JP2015/051315 filed Jan. 20, 2015.
(Continued)

*Primary Examiner* — Paul West
*Assistant Examiner* — Mark A Shabman
(74) *Attorney, Agent, or Firm* — DLA Piper LLP (US)

(57) ABSTRACT

Degradation of a running wheel is detected without using a special sensor or the like. Degradation of a running wheel of a running vehicle that travels using the running wheel that is rotated by a running motor is detected. A difference between a velocity of the running wheel obtained based on a number of rotations of the running wheel and a ground speed of the running vehicle, is obtained as a slip velocity, and degradation of the running wheel is detected based on a fact that torque of the running motor and the slip velocity have passed through a predetermined abnormal range in a space comprising a torque component and a slip velocity component.

5 Claims, 6 Drawing Sheets

(51) Int. Cl.
*B61B 13/00* (2006.01)
*B60B 17/00* (2006.01)

(56) References Cited

U.S. PATENT DOCUMENTS

| 5,747,686 A | 5/1998 | Nishihara et al. |
| 2006/0076095 A1 | 4/2006 | Oshiro |
| 2010/0126264 A1 | 5/2010 | Oshiro |

FOREIGN PATENT DOCUMENTS

| JP | 2007-022282 A | 2/2007 |
| JP | 4324531 B2 | 6/2009 |
| JP | 2011-105255 A | 6/2011 |

OTHER PUBLICATIONS

English language translation of International Search Report dated Apr. 21, 2015 issued in corresponding PCT application PCT/JP2015/051315.

Extended European Search Report dated Sep. 20, 2017 (Sep. 20, 2017), issued in corresponding European Patent Application No. EP 15761780.4 (EP 15 761 780).

* cited by examiner

F I G. 3
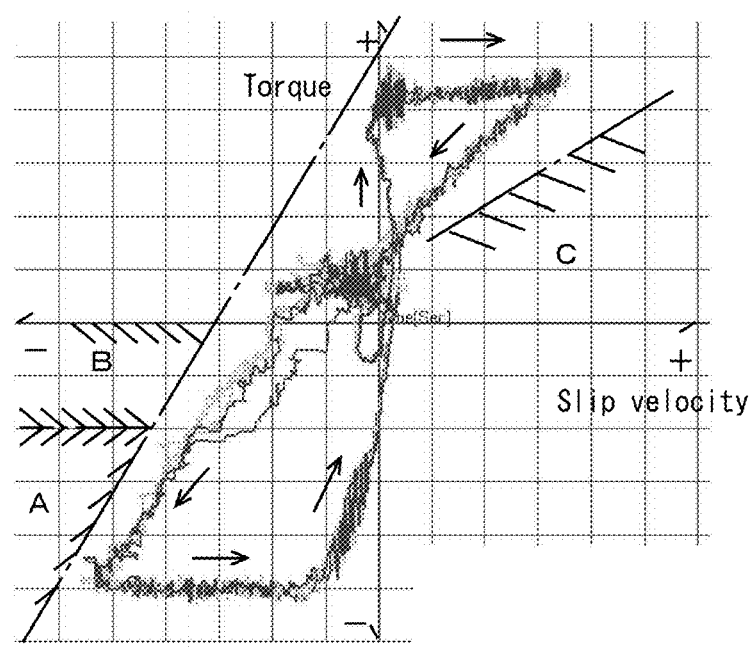
F I G. 4
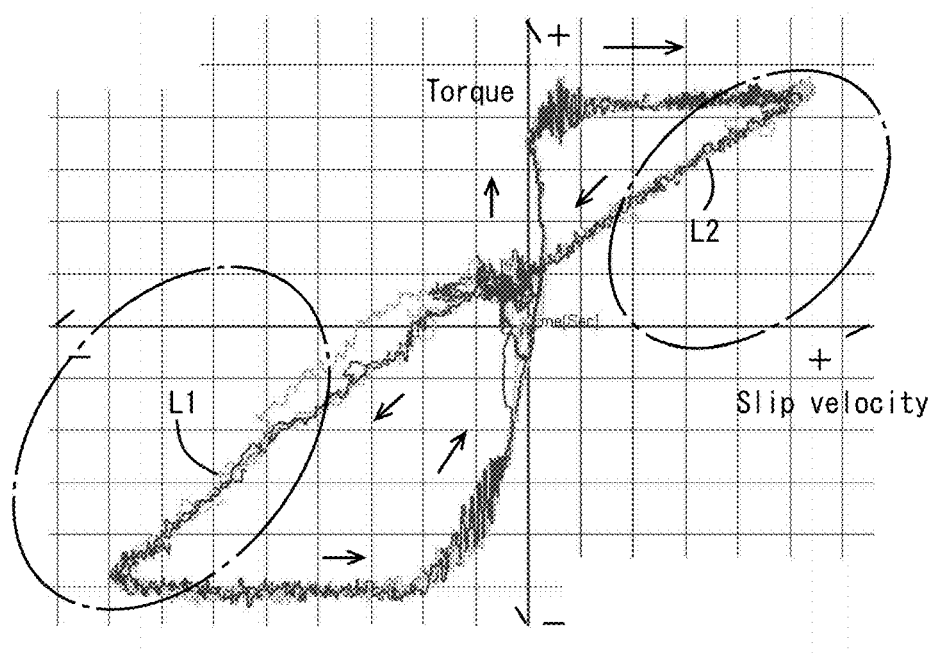

F I G. 7
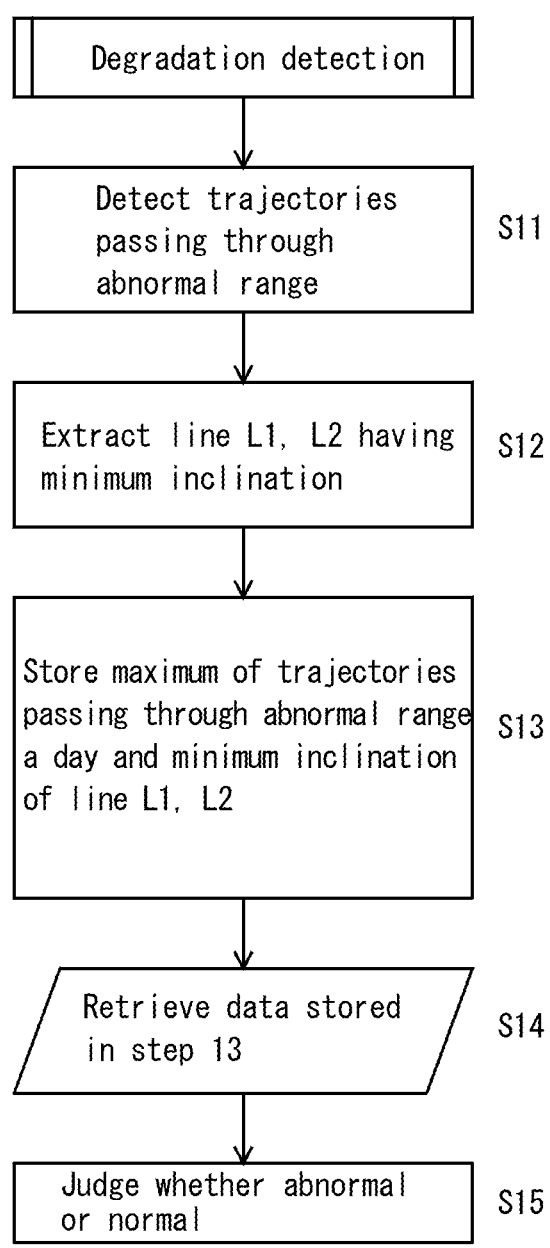

TRAVEL WHEEL DEGRADATION DETECTION METHOD AND DETECTION SYSTEM, AND TRAVEL CARRIAGE

CROSS REFERENCE TO RELATED APPLICATIONS

This application is a national stage of international application no. PCT/JP2015/051315, filed on Jan. 20, 2015, and claims the benefit of priority under 35 USC 119 of Japanese application no. 2014-046797, filed on Mar. 10, 2014, both of which are incorporated herein by reference in their entirety.

BACKGROUND OF THE INVENTION

Field of the Invention

The present invention relates to degradation detection for a running wheel of a running vehicle.

Description of the Related Art

The applicant has been developing and manufacturing overhead travelling vehicles that travel in overhead spaces of clean-rooms or the like. The structure of the running vehicle part in the overhead travelling vehicles is disclosed in Patent Literature 1 (JP2002-308404A), for example. In the overhead travelling vehicles, a pair of front and rear vehicle units are each provided with following wheels and guide rollers, and a driving wheel unit is further provided so as to span the pair of front and rear vehicle units. The driving wheel unit is provided with a running motor and a running wheel (driving wheel), and the running wheel is biased so as to be kept in contact with the travel rail at a predetermined contact pressure. The running wheel is solid and made of polyurethane rubber, for example.

As a consequence of repeated running, the running wheel made of synthetic resin develops a rough surface due to abrasion. The rough surface may lead to the running wheel bursting, in which case the surface of the running wheel separates, and then it becomes necessary to stop the overhead travelling vehicle and replace the running wheel. The degradation is not uniform between the running wheels. Therefore, it is necessary to choose whether to replace the running wheel well before the degradation becomes problematic, or to let a burst or the like of the running wheel occur due to delayed replacement and thus to take the risk of the running route being impassable due to the stopped overhead travelling vehicle.

Patent Literature 2 (JP3509330B) discloses detecting the decrease in the pressure of the tires of a four-wheel automobile based on the decrease in the diameters of the tires. Patent Literature 2 detects a driving wheel slip ratio according to the ratio of the number of rotations of the driving wheel and that of the following wheel. It concludes that, in the plot of the torque applied to the driving wheel and the slip ratio, the slip ratio at 0 torque reflects the decrease in the diameter of the driving wheel due to the decrease in the tire pressure. However, this method does not work for degradation of the surface of the running wheels caused by abrasion or the like. The inventor has confirmed this fact by experiments.

CITATION LIST

Patent Literature

Patent Literature 1: JP2002-308404A
Patent Literature 2: JP3509330B

SUMMARY OF THE INVENTION

Problem to be Solved by the Invention

The object of the present invention is to detect the degradation of a running wheel without a special sensor or the like.

Means for Solving Problem

One aspect of the present invention is a running wheel degradation detection method for a running vehicle that travels with the running wheel that is rotated by a running motor, comprising:

obtaining a difference between a velocity of the running wheel obtained based on a number of rotations of the running wheel and a ground speed of the running vehicle as a slip velocity; and detecting degradation of the running wheel based on a fact that torque of the running motor and the slip velocity have passed through a predetermined abnormal range in a space comprising a torque component and a slip velocity component.

Another aspect of the present invention is a running wheel degradation detection system for a running vehicle that travels with the running wheel that is rotated by a running motor, comprising:

a means for obtaining a difference between a velocity of the running wheel obtained based on a number of rotations of the running wheel and a ground speed of the running vehicle as a slip velocity; and a means for detecting degradation of the running wheel based on a fact that torque of the running motor and the slip velocity have passed through a predetermined abnormal range in a space comprising a torque component and a slip velocity component.

Yet another aspect of the present invention is a running vehicle that travels with a running wheel that is rotated by a running motor and has a function of collecting data for detecting degradation of the running wheel, comprising:

a means for obtaining a difference between a velocity of the running wheel obtained based on a number of rotations of the running wheel and a ground speed of the running vehicle as a slip velocity; and a means for detecting and storing a fact that torque of the running motor and the slip velocity have passed through a predetermined abnormal range in a space comprising a torque component and a slip velocity component.

The inventor has found that degradation of running wheels is detectable based on the trajectories in an at least two-dimensional space comprising the slip velocity component and the torque component, as shown in FIG. 3 (normal) and FIG. 4 (abnormal). Specifically, if the running wheel degrades, the trajectories pass through an abnormal range such as ranges A, B, and C shown in FIG. 3. Thus, the degradation of the running wheel is detectable. In contrast, no significant characteristics have been found in the trajectories of the slip ratio and the torque (FIG. 9).

The abnormal range is, for example, a range in which the inclination of torque relative to the slip velocity is smaller than or equal to a reference value, and, more preferably, is a range in which the inclination of the torque relative to the slip velocity during deceleration is smaller than or equal to a reference value. If the running wheel deteriorates, the inclination of the torque relative to the slip velocity shown in FIG. 3 and FIG. 4 decreases, and in particular, the inclination during deceleration of the running vehicle remarkably decreases.

The running wheel to be monitored is solid and made of synthetic resin, for example. According to one aspect of the present invention, roughening or roughness of the surface of the running wheel due to abrasion is detectable as the degradation, for example.

It is preferable to perform the determination, for example, based on the frequency that the abnormal range is passed through, instead of directly determining the abnormality upon the abnormal range being passed through once. It is preferable that the inclinations of the lines L1 and L2 shown in FIG. 4 are taken into consideration in addition to the frequency that the abnormal range is passed through. Furthermore, it is more preferable that the degree of degradation of the running wheel is determined in consideration with the transition of the frequency that the abnormal range is passed through or the transition of the inclinations of the lines L1 and L2 in addition to the transition of the frequency. For example, it is preferable that a range of the trajectories of the torque and the slip velocity for a new running wheel is defined as a reference range, and a range that is deviated from the reference range is defined as the abnormal range. This means that the trajectories at the early stage of the running wheel are assumed as normal trajectories, and the degree of degradation is determined based on the degree of the shift from the trajectories at the early stage since the usage of the running wheel.

BRIEF DESCRIPTION OF THE DRAWINGS

FIG. 3 is a diagram showing trajectories of slip velocity and torque for a normal running wheel.

FIG. 4 is a diagram showing trajectories of slip velocity and torque for a degraded running wheel.

FIG. 7 is a flowchart showing a degradation detection algorithm.

DETAILED DESCRIPTION OF THE PREFERRED EMBODIMENTS

Figure 1:
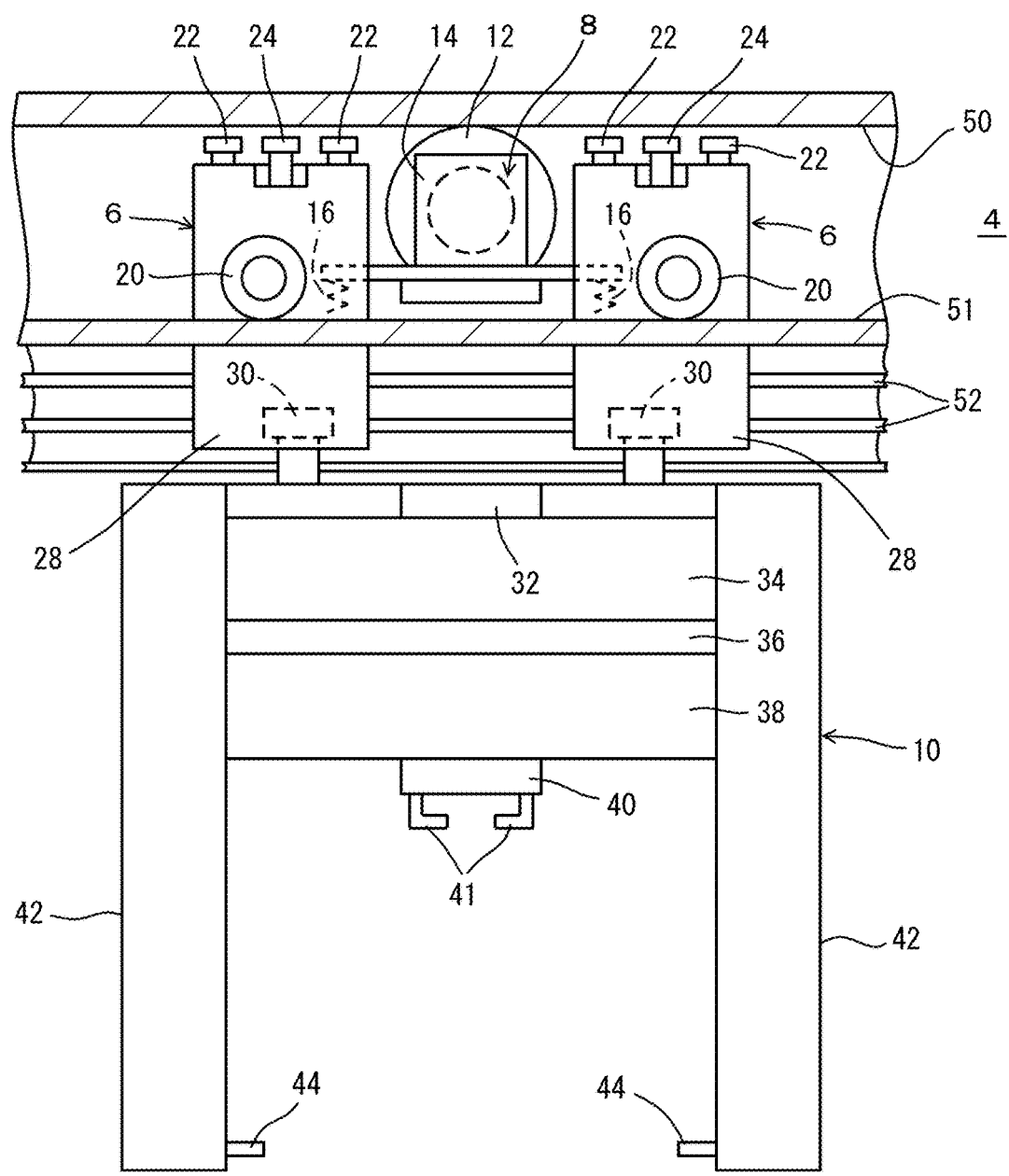
FIG. 1 is a side view showing an overhead travelling vehicle and a cutaway rail according to an embodiment.

The following describes a preferred embodiment for carrying out the present invention. The scope of the present invention shall be determined based on the claims, with reference to the description in the specification and well known arts, and in accordance with the understandings of the skilled man in the art.

Embodiment

FIGS. 1 to 7 show the embodiment. Reference numeral 2 indicates an overhead travelling vehicle which may be another running vehicle such as a stacker crane or an auto-guided vehicle. The travelling vehicles that travel with one or more solid running wheels made of synthetic resin are preferably monitored for the detection of running wheel degradation. Reference numeral 4 indicates a rail provided for overhead travelling vehicles in a clean-room, for example. The overhead travelling vehicle 2 is provided with a pair of front and rear vehicle units 6 that are located within the rail 4, and a driving wheel unit 8 is disposed between the vehicle units 6. Reference numeral 10 indicates the main body of the overhead travelling vehicle 2.

The driving wheel unit 8 is provided with a running wheel 12, which serves as the driving wheel, and a running motor 14. The driving wheel unit 8 is rotatably supported about the vertical axis by the vehicle units 6 at the front and rear ends and is pressed by a biasing part 16 such that the running wheel 12 is kept in contact with a tread 50 of the rail 4 at a predetermined contact pressure. The running wheel 12 is solid and made of polyurethane rubber, and enables the overhead travelling vehicle 2 to travel with the friction between the running wheel 12 and the tread 50. The vehicle units 6 are each provided with following wheels 20, and guide rollers 22 and 24 for switching between divergence and straightforward travel, and the following wheels are in contact with a tread 51. The vehicle units 6 are each further provided with an electricity pick-up unit 28 and support the main body 10 with cross-roller bearings 30. The running wheel may be in contact with the rail at the bottom part thereof instead of the top part.

The overhead travelling vehicle 2 is provided with a linear sensor 32 that reads magnetic marks that are installed on the rail 4, and detects the absolute position of the overhead travelling vehicle 2. The overhead travelling vehicle 2 also detects the number of rotations of the running wheel 12 with an encoder (not shown) of the running motor 14. Furthermore, the overhead travelling vehicle 2 communicates with a ground controller with a communication unit (not shown). The main body 10 is provided with a lateral unit 34 that laterally moves a θ unit 36 and a hoist 38 in a horizontal plane along a direction orthogonal to the travelling direction. The θ unit 36 rotates the hoist 38 about the vertical axis. The hoist 38 raises and lowers a hand 40 that is provided with a chuck 41. The rail 4 is provided with the treads 50 and 51, holds litz wires by litz wire holders 52, and feeds electricity to the pick-up unit 28 without contact.

Figure 2:
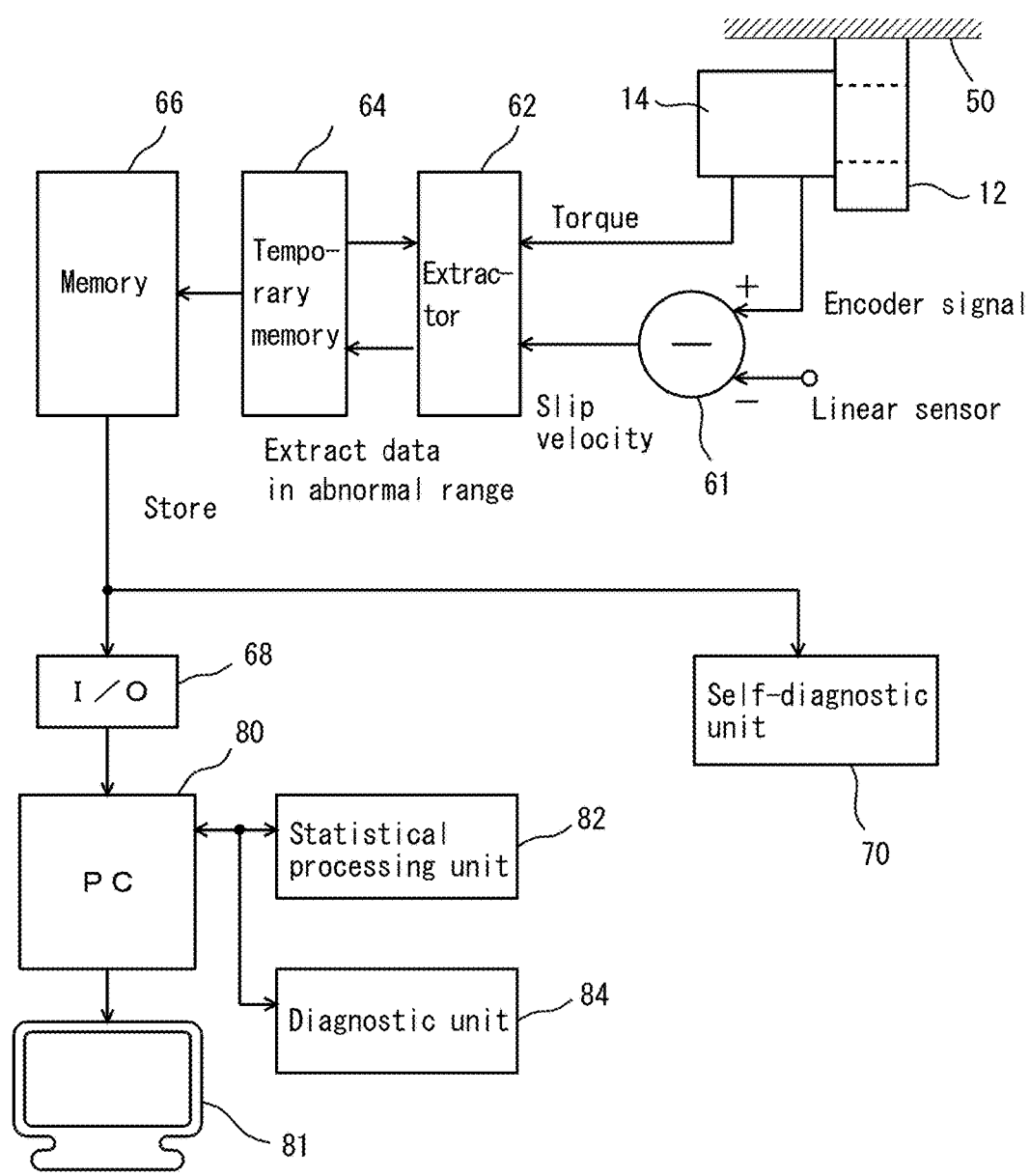
FIG. 2 is a block diagram of a running wheel degradation detection system.

FIG. 2 shows a degradation detection system 60 for the running wheel. Output torque signal and encoder signal are taken out of the running motor 14. A difference calculator 61 calculates the difference between the encoder signal and the linear sensor signal, and thus the slip velocity is obtained. Note that, for example, a signal from an encoder that is attached to a following wheel may be used in place of the linear sensor signal. The torque is calculated based on the driving current of the running motor 14, for example.

As shown in FIG. 3, an abnormal range is defined for the data of the pair of the torque and the slip velocity. In addition to this data, the inclinations of lines L1 and L2 shown in FIG. 4 are also useful for normality/abnormality determination, and in particular, the inclination of the line L1 is useful. Upon detecting an abnormal data where the pair of the torque and the slip velocity falls within the abnormal range, an extractor 62 counts and stores the frequency of abnormal data in a temporary memory 64. For example, when the pair passes through the abnormal range once or more in a single cycle comprising acceleration, constant-velocity running, deceleration, and stopping, the cycle is determined as being abnormal, and the frequency of abnormal cycles per day is stored in the temporary memory 64. Also, in order to obtain the inclinations of the lines L1 and L2 shown in FIG. 4, for each torque value, the maximum value of the slip velocity is stored. The inclination and the intercepts corresponding to the line L1 shown in FIG. 4 are obtained by connecting the maximum values within the negative range of the torque, and the inclination and the intercepts corresponding to the line L2 are obtained by connecting the maximum values within the positive range of the torque, for example. A memory 66 stores the maximum frequency of abnormal data (abnormal cycles) per day for each month, and the maximum value of the slip velocity for each torque within each month, for example.

Figure 5:
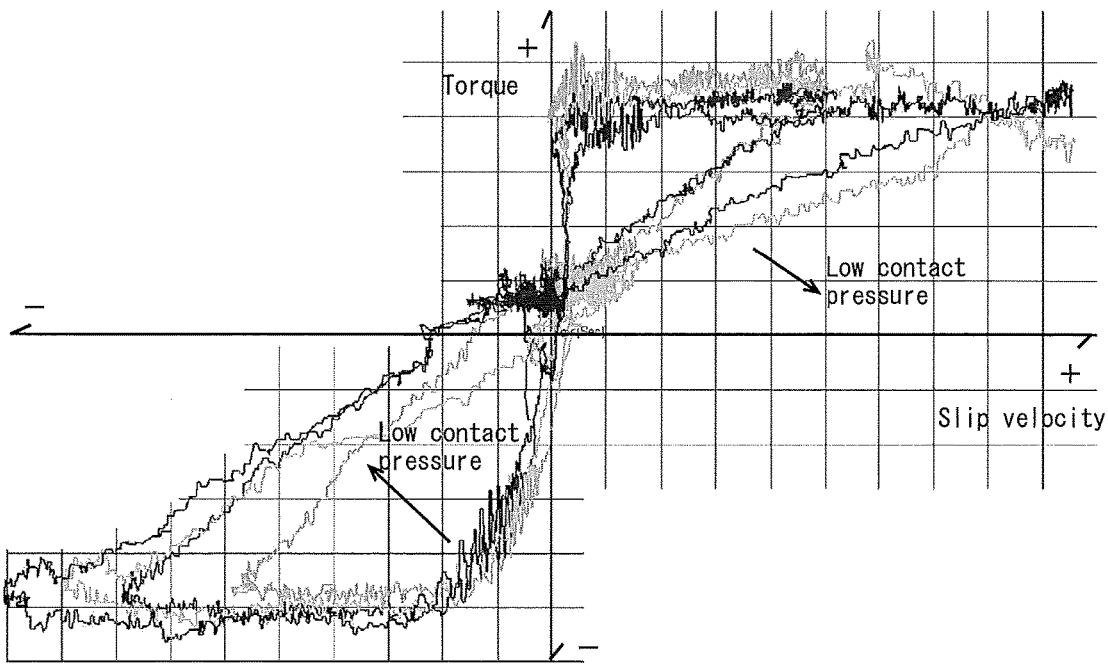
FIG. 5 is a diagram showing trajectories of slip velocity and torque for a variety of contact pressures.

Upon a problem irrelevant to the status of the running wheel, such as grease adhesion to the rail, the trajectories of the torque and the slip velocity may become abnormal and significantly different from the trajectories shown in FIGS. 3 to 5. Therefore, the extractor 62 may examine the outlines of the trajectories in each cycle and may process only trajectories that have a reasonable outline.

A single detection of an abnormal data may not be used as an indication of degradation in order to exclude noises. The maximum frequency of abnormal data per day may be substituted with the maximum frequency per week or the total frequency of abnormal data per month. The data regarding the inclination and the gradient or the data regarding the inclination is extracted as reference data for normality/abnormality determination. If the memory 66 has a sufficient capacity, the entire waveform shown in FIG. 4 corresponding to abnormal data may be stored therein. The ranges A and B during deceleration are useful for normality/abnormality determination, and the range A where the absolute value of the torque during deceleration is greater than or equal to 40% of the maximum value in the trajectories is particularly useful.

The life span of the running wheel is about several years and depends on the working conditions, in particular, the frequency of curve running. Therefore, the normality/abnormality determination may be performed once for a period from a week to three months, for example. For example, when the overhead travelling vehicle arrives at a maintenance area, the data in the memory 66 is retrieved via an input/output (I/O) 68, and an abnormality in the running wheel is detected by a personal computer (PC) 80 provided with a statistical processing unit 82 or a diagnostic unit 84, and a monitor 81. Note that another sort of computer may be used in place of the PC.

With the statistical processing unit 82, an operator may visually perform the normality/abnormality determination based on information displayed on the monitor 81. In this case, the statistical processing unit 82 causes the monitor 81 to display the transition of the maximum frequency of abnormal data, the transition of the inclinations corresponding to the lines L1 and L2, and so on for each month, during the period from when the running wheel was new to the present time, for example. When the normality/abnormality is determined by the system 60, the diagnostic unit 84 evaluates these data and determines whether the wheel is normal or abnormal. In addition, the overhead travelling vehicle may perform a self-diagnosis of the normality/abnormality of the running wheel. For example, a self-diagnostic unit 70 similar to the diagnostic unit 84 may be provided within the overhead travelling vehicle, and a notification may be provided to the ground controller when the running wheel is determined as abnormal.

FIG. 3 shows the trajectories of the torque and the slip velocity for five cycles for a normal running wheel, and FIG. 4 shows similar trajectories for a degraded running wheel. The contact pressures on the running wheels were set to be the same in FIG. 3 and FIG. 4, and the directions of the trajectories are indicated by arrows in FIG. 3 and FIG. 4. The clear difference between FIG. 3 and FIG. 4 is that the inclination of the torque to the slip velocity is reduced due to the degradation. There was a case where the maximum value of the slip velocity during acceleration approaches the range C for a normal running wheel at some contact pressures. Therefore, the reliability of abnormality detection is improved by determining whether or not the maximum value of the slip velocity has passed during deceleration through the ranges A and B or the range A.

The running wheel is normal at first, and a large number of trajectories that are similar to the trajectories shown in FIG. 3 are obtainable at this stage. Therefore, ranges deviating from the normal trajectory distribution may be defined as the abnormal ranges. For example, the ranges A, B, and C shown in FIG. 3 may be used as abnormal ranges, the abnormal ranges A and B are more preferably usable, and the abnormal range A is the most preferably usable. The degradation of the running wheel is characterized by the decrease in the inclinations of the lines L1 and L2, in particular, the decrease in the inclination of the line L1. The normality/abnormality determination is made easier by extracting these inclinations at the time of determination and comparing them with the initial values.

The trajectories of the torque and the slip velocity change according to the contact pressure on the running wheel, and, with reduced contact pressures, they change as shown in FIG. 5. In FIG. 5, the contact pressure was changed for the entire range of the practical pressures for a degraded wheel. It is preferable that the trajectories shown in FIG. 3 are learned when the running wheel is new, the abnormal range A and so on are defined based on the trajectories, and the line L1, or the inclination of the line L1, or the like is stored.

Figure 6:
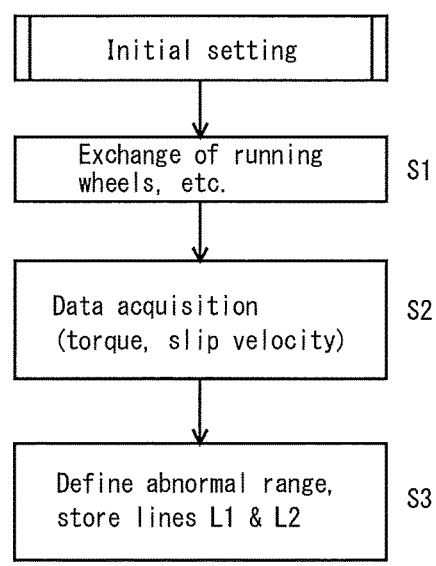
FIG. 6 is a flowchart showing an initial setting algorithm for degradation detection.

FIG. 6 shows initial setting for the normality/abnormality determination to be performed when the running wheel is exchanged, or when a new overhead travelling vehicle is set to the rail (step 1). In step 2, the trajectories of the torque and the slip velocity are measured. In step 3, the abnormal range A and so on are defined, and the initial values of the lines L1 and L2, or the line L1, or the inclination of the line L1, or the like are stored.

FIG. 7 shows the degradation detection (normality/abnormality determination) for the running wheel. In step 11, cycles passing through the abnormal range are detected. In step 12, the maximum value of the slip velocity is extracted for each torque, and thus the lines L1 and L2 or the line L1 having the minimum inclination is extracted. In step 13, the frequency of trajectories passing through the abnormal range per day is obtained, and the maximum frequency (the maximum frequency of the trajectories passing through the abnormal range per day) is stored for each month. Also, the minimum inclination of the lines L1 and L2 or the line L1 within each month is stored.

For example, when the overhead travelling vehicle arrives at the maintenance area, the data in the memory is retrieved (step 14), and normality/abnormality is determined based on the aforementioned maximum frequency and the aforementioned minimum inclination of the lines. If there is an abnormality, the running wheel is exchanged, and the procedures shown in FIG. 6 are executed (step 15). This determination of normality/abnormality is based on the transition of the frequency of trajectories passing through the abnormal range and the transition of the minimum inclination of the lines L1 and L2 or the line L1.

Figure 8:
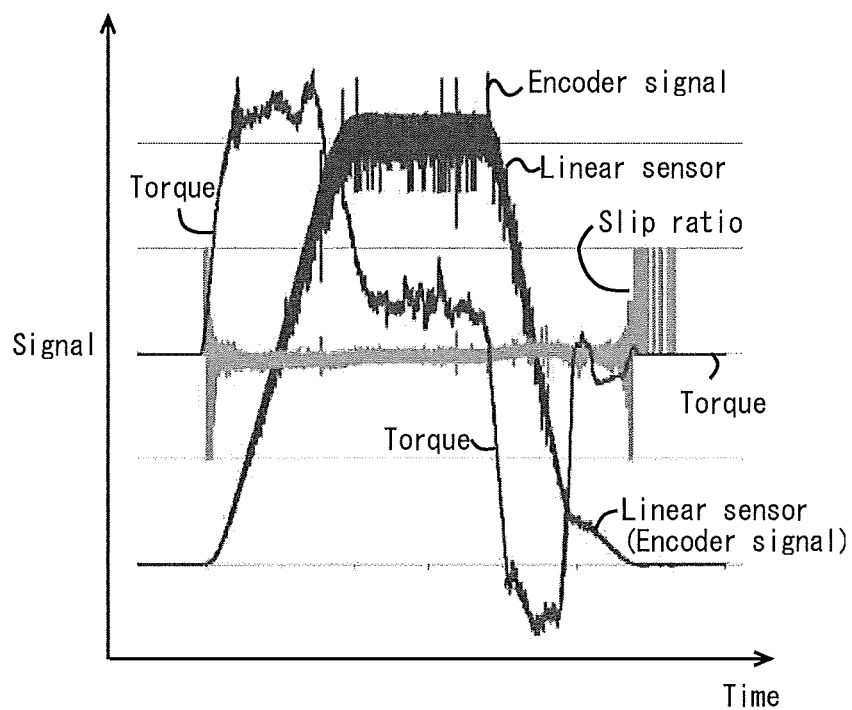
FIG. 8 is a waveform diagram showing encoder signal, linear sensor signal, slip ratio, and torque.
Figure 9:
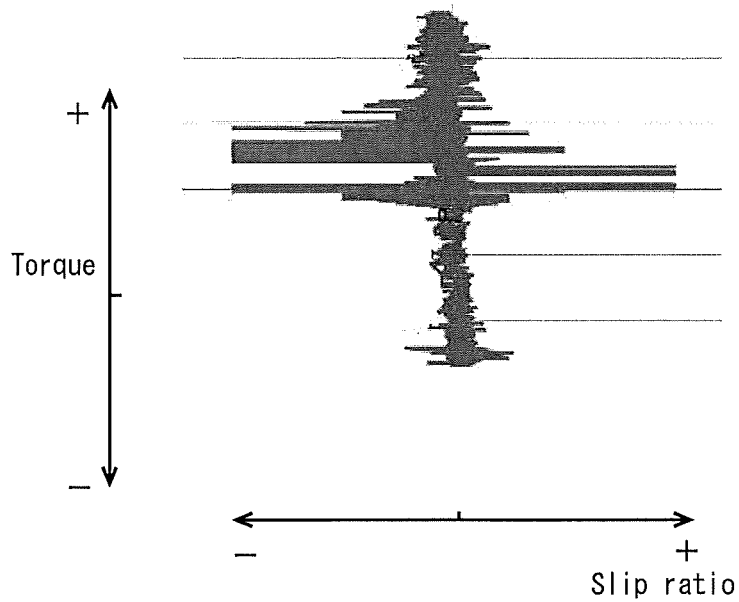
FIG. 9 is a diagram showing trajectories of a pair consisting of torque and a slip ratio.

FIG. 8 and FIG. 9 show the torque and the slip ratio for a degraded running wheel. FIG. 8 shows the waveform of the torque and the slip ratio over time, and FIG. 9 shows the trajectory of the torque and the slip ratio. The trajectory shown in FIG. 9 is completely different from the trajectories described in Patent Literature 1. No characteristic to determine degradation of the running wheel can be found in FIG. 8 or FIG. 9. Also, although not shown here, trajectories that are similar to those shown in FIG. 9 were obtained for a normal running wheel as well. It may be assumed that Patent Literature 1 detects a situation where the front wheel and the rear wheel have different diameters due to a decrease in the tire pressure, and it is reasonable to assume that the slip ratio changes in such a situation. According to the embodiment, how the surface roughening of a running wheel due to the abrasion influences the slip velocity has been investigated, and the slip velocity relative to the torque is extracted. It has been found that, if the surface of a running wheel is roughened, the inclination of the torque relative to the slip velocity decreases, and particularly, the inclination of the torque relative to the slip velocity decreases during deceleration of the running vehicle. These facts give a detection method for degraded running wheels.

| List of Reference Numerals | |
|---|---|
| 2 | Overhead travelling vehicle |
| 4 | Rail |
| 6 | vehicle unit |
| 8 | Driving wheel unit |
| 10 | Main body |
| 12 | Running wheel |
| 14 | Running motor |
| 16 | Biasing part |
| 20 | Following wheel |
| 22, 24 | Guide roller |
| 28 | Pick-up unit |
| 30 | Cross-roller bearing |
| 32 | Linear sensor |
| 34 | Lateral unit |
| 36 | θ unit |
| 38 | Hoist |
| 40 | Hand |
| 41 | Chuck |
| 50, 51 | Tread |
| 52 | Litz wire holder |
| 60 | degradation detection system for running wheel |
| 61 | Difference calculator |
| 62 | Extractor |
| 64 | Temporary memory |
| 66 | Memory |
| 68 | I/O |
| 70 | Self-diagnostic unit |
| 80 | PC |
| 81 | Monitor |
| 82 | Statistical processing unit |
| 84 | Diagnostic unit |

What is claimed is:

1. A running wheel degradation detection method for a running vehicle that travels with a running wheel that is rotated by a running motor, comprising:
    obtaining a difference between a linear velocity of the running wheel obtained based on a number of rotations of the running wheel and a ground speed of the running vehicle as a slip velocity; and
    detecting degradation of the running wheel when torque of the running motor and the slip velocity have passed through a predetermined abnormal range in a space comprising a torque component and a slip velocity component; and
    the running wheel is solid and made of synthetic resin.

2. The running wheel degradation detection method according to claim 1, wherein the abnormal range is a range in which an inclination of the torque relative to the slip velocity is smaller than or equal to a reference value.

3. The running wheel degradation detection method according to claim 2, wherein the abnormal range is defined as a range during deceleration of the running vehicle.

4. A running wheel degradation detection system for a running vehicle that travels with a running wheel that is rotated by a running motor, comprising:
    a means for obtaining a difference between a linear velocity of the running wheel obtained based on a number of rotations of the running wheel and a ground speed of the running vehicle as a slip velocity; and
    a means for detecting degradation of the running wheel that detects when torque of the running motor and the slip velocity have passed through a predetermined abnormal range in a space comprising a torque component and a slip velocity component; and
    the running wheel is solid and made of synthetic resin.

5. A running vehicle that travels with a running wheel that is rotated by a running motor and has a function of collecting data for detecting degradation of the running wheel, comprising:
    a means for obtaining a difference between a linear velocity of the running wheel obtained based on a number of rotations of the running wheel and a ground speed of the running vehicle as a slip velocity; and
    a means for 1) detecting that torque of the running motor and the slip velocity have passed through a predetermined abnormal range in a space comprising a torque component and a slip velocity component and 2) storing detected information; and
    the running wheel is solid and made of synthetic resin.

* * * * *